United States Patent [19]

Jester

[11] Patent Number: 4,561,325

[45] Date of Patent: Dec. 31, 1985

[54] TRANSMISSION AND RANGE BOX CONTROL

[75] Inventor: Terry L. Jester, Stony Ridge, Ohio

[73] Assignee: Dana Corporation, Toledo, Ohio 43697

[21] Appl. No.: 543,525

[22] Filed: Oct. 20, 1983

[51] Int. Cl.$^4$ ............................ F16H 3/02; F16H 3/08
[52] U.S. Cl. ................................. 74/745; 74/473 R; 74/475; 74/477
[58] Field of Search ................. 74/745, 473 R, 477, 74/475

[56] References Cited

U.S. PATENT DOCUMENTS

| | | |
|---|---|---|
| 1,742,749 | 1/1930 | Bock et al. |
| 1,780,898 | 11/1930 | Blood et al. |
| 2,428,892 | 10/1947 | Plexico |
| 2,435,929 | 2/1948 | Plexico |
| 2,445,716 | 7/1948 | Sternberg ............................ 74/745 |
| 2,640,374 | 6/1953 | Willis ................................. 74/745 |
| 3,049,934 | 8/1962 | Butler et al. |
| 3,093,008 | 6/1963 | Wight |
| 3,429,202 | 2/1969 | Galicher |
| 3,498,155 | 3/1970 | Ivanchich et al. ................. 74/745 |
| 4,441,379 | 4/1984 | Malkowski et al. ............. 74/745 X |
| 4,455,883 | 6/1984 | Radcliffe ...................... 74/473 R X |
| 4,485,692 | 12/1984 | Moore et al. ....................... 74/745 |

Primary Examiner—Larry Jones
Attorney, Agent, or Firm—David D. Murray

[57] ABSTRACT

A transmission range selection device for use with a vehicle transmission having a main gear box and auxiliary two-speed gear box provides control over both with a single, conventional shift lever. The shift lever is pivotally mounted in the tower of the main transmission which is fitted with a switch. Shift forks associated with the main gear box shift rails are conventional except for that fork associated with the highest speed gears which has an extended throat, permitting shift lever movement into positions adjacent and beyond the positions associated with the highest gears of the standard shift pattern. When moved to these additional shift positions, the shift lever selects the highest gears of the transmission and activates the switch which in turn shifts the auxiliary gear box from its lower range to its higher range.

20 Claims, 4 Drawing Figures

TRANSMISSION AND RANGE BOX CONTROL

BACKGROUND OF THE INVENTION

The invention relates generally to vehicle transmission control devices and more specifically to a combined control device for a main transmission and auxiliary two-speed auxiliary range box.

Manual transmissions having two or three shift rails which provide reverse as well as three or five forward gear ratios, respectively, provide appropriate and sufficient gear ratio ranges and forward speeds to fulfill the requirements of a vast majority of transmission applications. Transmissions providing greater numbers of gear ratios, however, are routinely produced but their size, complexity and cost is representative of their specialization and rather more limited application.

Devices do exist, however, which extend the gear ratio range and thus capabilities of, for example, transmissions having five forward gears. Such devices are auxiliary gear boxes which are operably disposed in tandem with the main transmission. Typically, such auxiliary gear boxes or range boxes provide two gear ranges generally designated high and low which, when combined with the several ranges of the main transmission, effectively doubles the number of gear ranges which the overall transmission assembly provides. In practice, the plural ranges provided by the transmission when the auxiliary gear box is in one range typically overlap those provided when the auxiliary transmission is in its higher range. Thus, in practice, the auxiliary gear box is generally utilized only to augment the higher gears of the transmission by providing still lower overall gear ratios through the transmission assembly and thus improve fuel economy and highway performance.

A common means of permitting operator selection of the range of the auxiliary gear box comprehends providing a two position switch which may be controlled by the vehicle operator to select the desired range. Frequently, such switch is secured directly to the shift lever such that the operator may select both the gear of the main transmission and the range of the auxiliary transmission with one hand. Such a configuration, however, permits free choice of the range of both the main transmission and auxiliary gear box thus typically providing several ranges which overlap. While this is not specifically undesirable, such a situation tends to promote unnecessary gear shifts, clutch wear and less than optimum fuel economy and performance. This is to say nothing of the inconvenience created by the complex motion required to move both the shift lever and the range selector switch attached thereto. Another difficulty of such independent control over the main and auxiliary gear boxes relates to the possibility of inadvertently effecting a change in the ratio of the auxiliary gear box while the clutch is engaged and power is being transmitted through the transmission assembly. Since such a shift is undesirable, it is considered to be beneficial to include means whereby a change between the ratios of the auxiliary gear box is prohibited unless the main transmission is in neutral and thus not transferring power.

SUMMARY OF THE INVENTION

The instant invention relates to a transmission range selection device for use with a vehicle transmission having a main gear box including a plurality of forward and reverse gear ratios and an auxiliary gear box providing two additional gear ratios in tandem with the main gear box ratios. The range selection device provides control over both transmissions with but a single, conventional shift lever pivotally disposed in the tower of the main gear box. The main gear box shift tower also includes a switch which may be activated by the shift lever. The switch is positioned such that motion of the shift lever beyond the positions wherein it activates the highest speed gear ratios of the main gear box also activates the switch. The fork on the shift rail associated with the highest speed gear ratios is of a special elongated construction which permits substantial excursion of a shift lever between the forks. The shift pattern of the main gear box includes additional shift lever positions adjacent and beyond the highest speed gear ratios of the standard shift positions. When moved into these additional shift positions, the shift lever activates the switch to shift the auxiliary gear box from its lower to its higher speed range and selects one of the higher speed gear ratios of the main transmission. In effect, the instant invention extends the shift pattern of a conventional transmission, adding at least two additional higher gears in positions which conform wholly to the shift pattern established by the available gear ratios of the main gear box. The instant invention also inhibits utilization of the higher range of the auxiliary gear box except when the higher ranges of the main gear box have been selected. Finally, the instant device effectively operates as an interlock against change of the selected gear ratio of the auxiliary gear box since it can only be deactivated or activated by motion of the main shift lever into or away from the neutral position.

Thus it is an object of the instant invention to provide a transmission range selection device for use with a main gear box and an auxiliary gear box.

It is a further object of the instant invention to provide a transmission range selection device which operates with a main gear box and an auxiliary gear box and which provides control over the selected gear ratios of both gear boxes with a single, conventional shift lever.

It is a still further object of the instant invention to provide a transmission range selection device for use with a main gear box and auxiliary gear box which inhibits use of the higher range of the auxiliary gear box with the lower ranges of the main gear box.

It is a still further object of the instant invention to provide a transmission range selection device for use with a main gear box and auxiliary gear box which inhibits change of the selected ratio of the auxiliary gear box while the main gear box is in gear.

Further objects and advantages of the instant invention will become apparent by reference to the following description of the preferred embodiment and appended drawings.

DESCRIPTION OF THE PREFERRED EMBODIMENT

Figure 1:
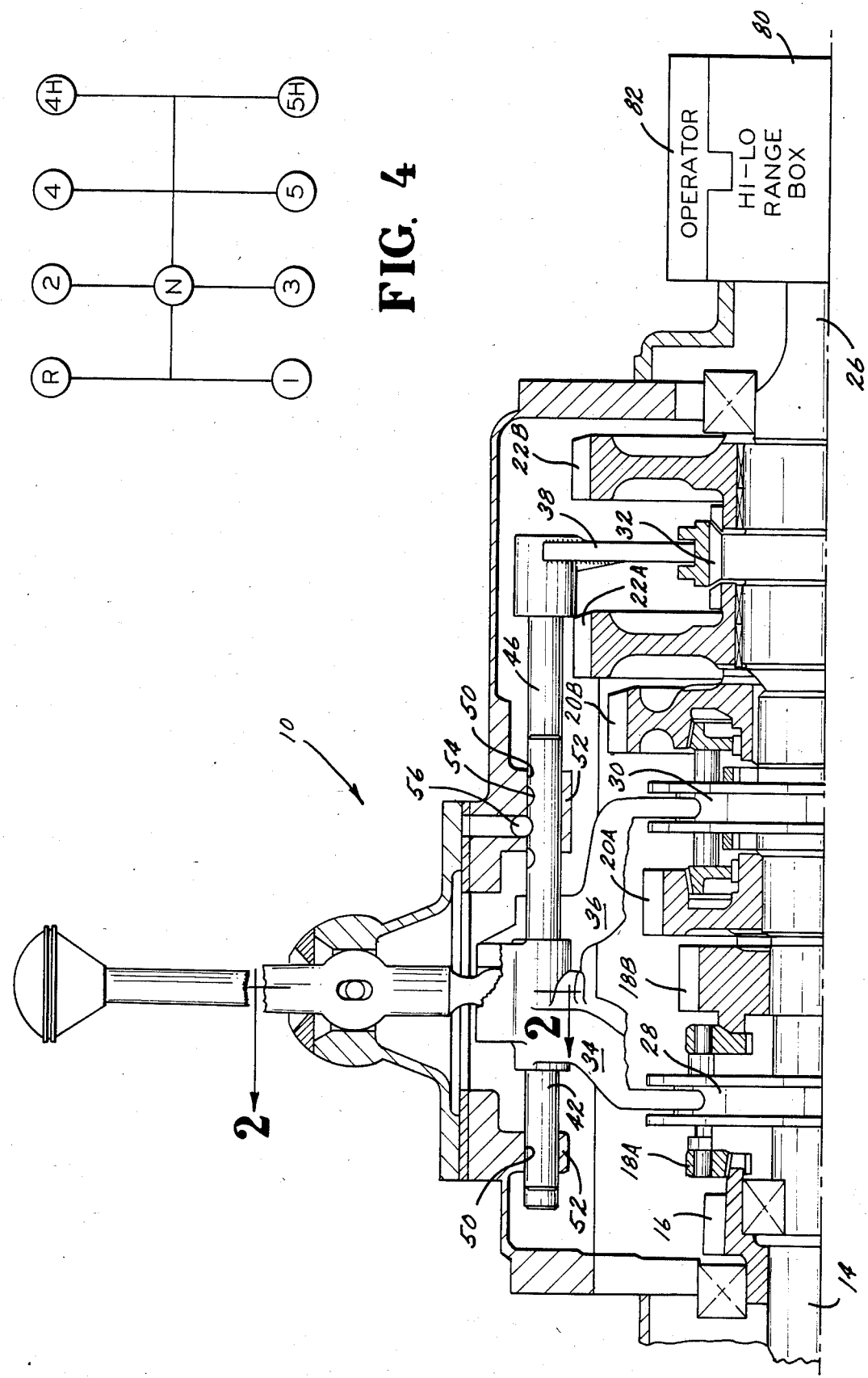
FIG. 1 is a fragmentary, sectional, diagrammatic view of a transmission having a main and auxiliary gear box which incorporates the instant invention.

Referring now to FIG. 1, a typical vehicle transmission assembly having five integral forward gears and one reverse gear is illustrated and generally designated by the reference numeral 10. The vehicle transmission assembly 10 includes a housing 12 which encloses the mechanisms of the transmission assembly 10 and provides suitable mounting and support therefore. The transmission assembly 10 includes an input shaft 14 which is mechanically coupled to a prime mover such as an internal combustion engine through a clutch mechanism (both not illustrated). The input shaft 14 drives a countershaft (not illustrated) through an input gear set, the device gear 16 being illustrated in FIG. 1. As those familiar with such transmissions will readily appreciate, a plurality of gears (not illustrated) which function as the drive elements of a like plurality of constantly meshing gear sets are secured to the countershaft. The driven elements of such gear sets are a plurality of gears 18A and 18B, 20A and 20B and 22A and 22B which are rotatably and concentrically disposed about an output shaft 26. Dog clutches 28, 30 and 32 are concentrically disposed about the output shaft 26 between the gears 18A and 18B, 20A and 20B and 22A and 22B, respectively. The dog clutches 28, 30 and 32 are coupled to the output shaft 26 through male and female spline sets (not illustrated) in a conventional manner. The spline sets thus permit axial translation of the dog clutches 28, 30 and 32 while rotatably coupling the dog clutches 28, 30 and 32 to the output shaft 26. Axial translation of the dog clutches 28, 30 and 32, effects selection of one of the gear ratios provided by one of the gears 18A, 18B, 20A, 20B, 22A and 22B and insertion of said gear into the power path between the input shaft 14 and output shaft 26 to provide a given speed and power range for the associated vehicle. Such axial translation of the dog clutches 28, 30 and 32 is effected by like translation of a like plurality of shift forks. A first shift fork 34 engages the dog clutch 28 and selects one of the two highest gear ranges of the transmission assembly 10 provided by the gears 18A and 18B, shift fork 36 engages the dog clutch 30 and selects the middle ranges of the transmission assembly 10 provided by the gears 20A and 20B and a shift fork 38 engages the dog clutch 32 and provides selection between reverse and the lowest forward gear of the transmission assembly 10 provided by the gear 22A and 22B.

Figure 2:
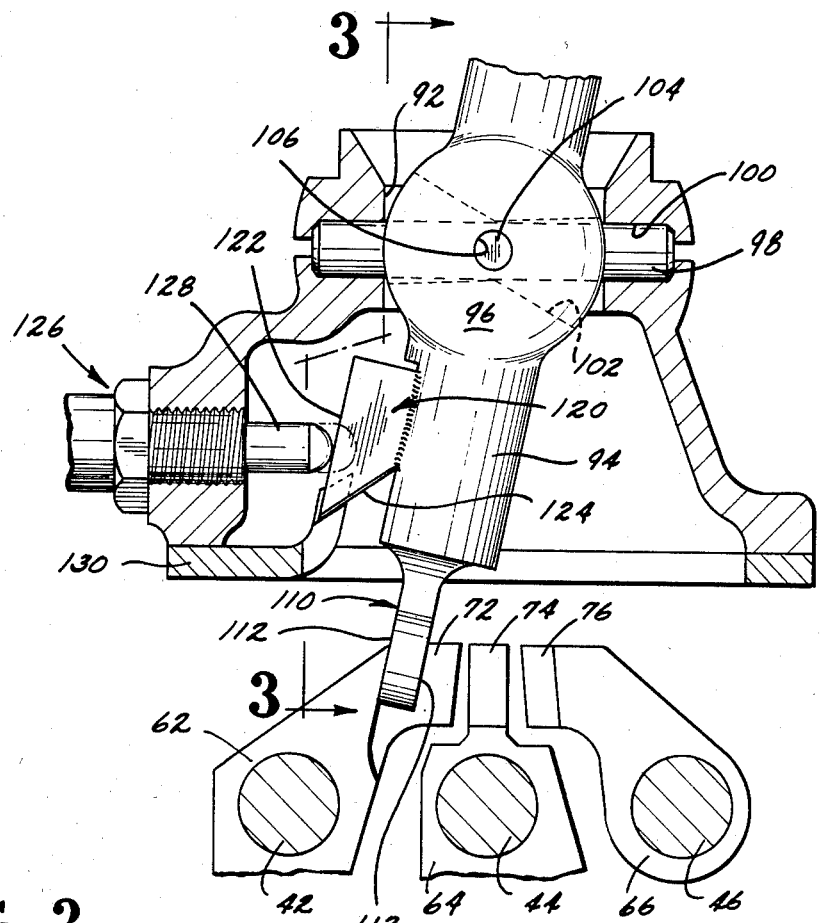
FIG. 2 is a full, sectional view of a transmission incorporating the instant invention taken along line 2—2 of FIG. 1.

With reference now to FIGS. 1 and 2, it will be appreciated that each of the shift forks 34, 36 and 38 is secured to and axially translated with an associated shift rail 42, 44 and 46, respectively. The shift rails 42, 44 and 46 are preferably disposed in parallel, co-planar alignment and may be slidably received within suitable aligned pairs of apertures 50 bored through appropriately disposed mounting ears 52 formed in the housing 12. Each of the shift rails 42, 44 and 46 include a plurality of recesses 54 which cooperate in a conventional manner with detent pins or balls 56, one of which is illustrated in FIG. 1, to interlock the shift rails 42, 44 and 46 in a conventional fashion. Also associated with each of the shift rails 42, 44 and 46 is a shift yoke 62, 64 and 66. The shift yoke 62 associated with the shift rail 42 may be an extension of the mounting structure for the shift fork 34 and will include a relatively deep shift lever receiving slot 72 having sidewalls generally disposed perpendicularly to the axes of the shift rails 42, 44 and 46. The shift yoke 64 associated with the shift rail 44 likewise includes a slot 74 having sidewalls disposed normal to the axis of the shift rail 44 and the yoke 66 which may preferably be a unitary structure secured to the shift rail 46 includes a relatively shallow slot 76 having sidewalls disposed perpendicularly to the axis of the shift rail 46.

Referring again to FIG. 1, the transmission assembly 10 also includes a dual range or high-low gear box 80 mechanically coupled to the output shaft 26. The high-low gear box 80 provides a first and a second independently selected gear ratio which functions in tandem with the gear ratio selected through the transmission assembly 10 and thus augments the ranges and effectively doubles the overall possible combination of gear ratios selectable through the overall transmission assembly 10. The high-low gear box 80 also includes an operator 82 which moves elements of the box 80 appropriately so that the higher or lower range of the range box 80 is selected and inserted in the power path. The operator 82 is preferably an electrically actuated solenoid but may, of course, be a pneumatically or hydraulically actuated piston chosen in accordance with appropriate design criteria and engineering considerations.

Figure 3:
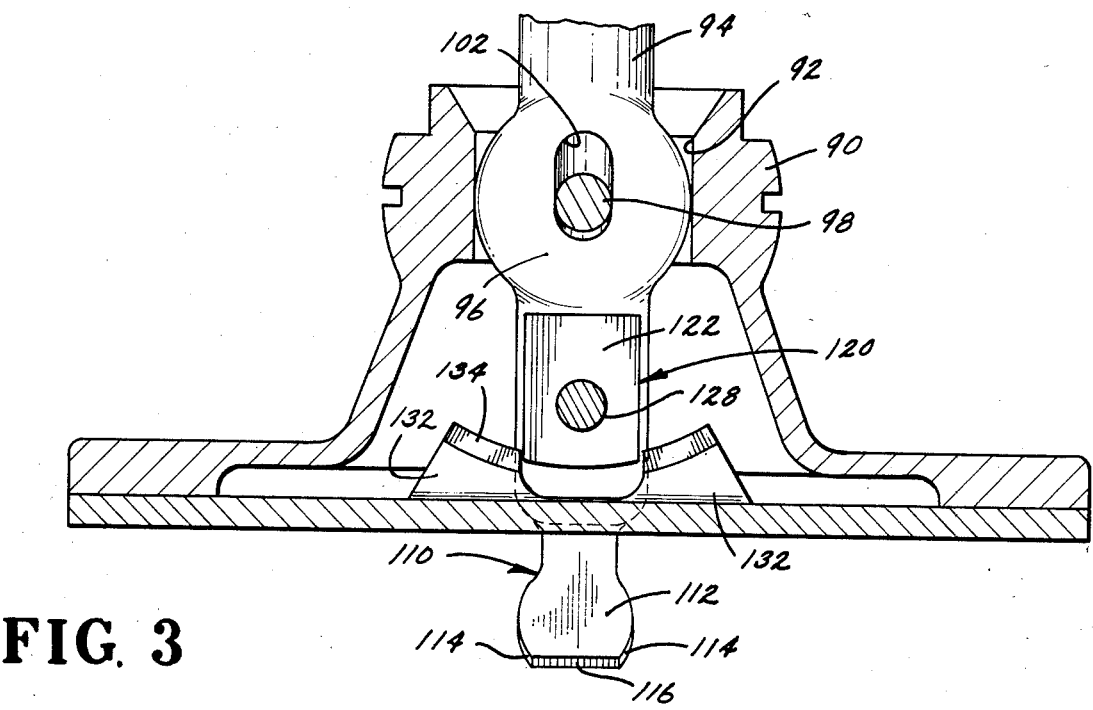
FIG. 3 is a fragmentary, sectional view of a tower of a transmission incorporating the instant invention.

Referring now to FIGS. 1, 2 and 3, the transmission assembly 10 also includes a shift tower 90 which is secured to the upper region of the housing 12 generally above and aligned with the shift yokes 62, 64 and 66. The shift tower 90 defines a vertically oriented opening 92 through which an elongate shift lever 94 is disposed. The shift lever 94 includes a spherical region 96 which is complementarily sized to the diameter of the opening 92 such that free motion about the center of the spherical region 96 is permitted. The spherical region 96 and thus the shift lever 94 are maintained appropriately within the opening 92 of the shift tower 90 by a cooperating pair of perpendicularly oriented retaining pins and apertures. The first retaining pin 98 extends laterally across the aperture 92 and is received within appropriate mounting apertures 100 in the shift tower 90. The retaining pin 98 extends through a specially configured aperture 102 in the spherical region 96 of the shift lever 94. The aperture 102 can be defined as a pair of opposed oval-conical apertures which limit pivoting of the shift lever 94 about an axis normal to the retaining pin 98. This axis normal to the retaining pin 98 is defined by a second retaining pin 104. The retaining pin 104 is disposed at right angles to the retaining pin 98 and coincident with a horizontal plane defined by the axis thereof. The retaining pin 104 is received within an aperture 106 in the spherical region 96 of the shift lever 94 and through a like sized aperture (not illustrated) which extends through the retaining pin 98.

At the lower extremity of the shift lever 94 is a shift tongue 110. As FIGS. 2 and 3 make manifest, the shift tongue 110 defines generally opposed planar faces 112 and curved edges 114 which are truncated by a flat, lower edge 116. Disposed generally between the spherical region 96 and the shift tongue 110 of the shift lever 94 is an actuating and locking structure 120. The structure 120 is a unitary extension of or intimately secured accessory to the shift lever 94 and includes firstly a surface 122 which faces the adjacent wall of the shift tower 90. The surface 122 may be generally planar but, as noted below, its function may be served by a broad and varied range of shapes and configurations. The structure 120 also includes a latching surface 124. The latching surface 124 is undercut and may define a generally curved obliquely oriented surface or any other design or configuration which provides appropriate locking function as will be described more completely below. Disposed in vertical alignment with the retaining pin 98 in the sidewall of the shift tower 90 is a two position switch assembly 126. The switch assembly 126 includes an axially translatable plunger 128 which is movable generally between a first and second position which provides a binary (on-off) output. The plunger 128 is aligned with the surface 122 of the actuating and locking structure 120 and is moved between its first and second positions by certain movements of the shift lever 94 as will be described subsequently. Also generally disposed within the shift tower 90 and secured between the shift tower 90 and the housing 12 of the transmission assembly 10 is a latch plate 130. The latch plate 130 includes a pair of locking tabs 132 which are symmetrically disposed about a vertical reference plane in which the axis of the retaining pin 98 lies. The locking tabs 132 define radiused, oblique upper surfaces 134 having their center of radius coincident with the longitudinal axis of the retaining pin 98. The oblique surfaces 134 are disposed at an angle which is parallel to that of the surface 124 when the two surfaces are in engagement as illustrated in FIG. 2. The angle of the surface 124 relative to the axis of the shift lever 94 is not critical although it should not be so great as to cause an excessively pointed lower extremity of the structure 120 and an angle between 40° and 50° has been found suitable. Other configurations such as a tongue and groove or similar detenting structure may also be utilized to maintain the shift lever 44 in the desired position.

Figure 4:
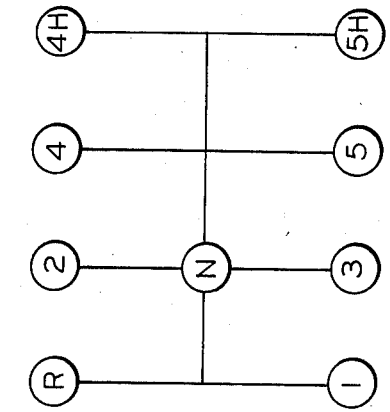
FIG. 4 is a diagram of a shift pattern of a transmission incorporating the instant invention.

Referring now to all of the drawing figures and particularly to FIGS. 2 and 4, the operation of the transmission and range box control will be described. As FIG. 4 suggests, the shift pattern and thus the operation of transmission assembly 10 in the reverse gear as well as the first five lower range forward gears is conventional and like that embodied in conventional transmissions. For example, when the shift lever 94 is moved to the extreme left of the shift pattern, the shift tongue 110 engages the slot 76 in the shift yoke 66 on the shift rail 46 thereby permitting selection of either reverse or first forward gear. Selection of the second and third forward gears is effected by moving the shift lever 90 to the vertical position, thereby effecting engagement of the shift tongue 110 in the slot 76 in the shift yoke 64 disposed on the shift rail 44. Selection of the fourth and fifth gears is achieved by further rightward motion of the upper portion of the shift lever 94 such that the shift tongue 110 engages the slot 72 in the shift yoke 62 in a first position thereby permitting selection of the highest forward speed ratios. It should be noted that throughout the former operations, the high-low gear box 80 is in its low range position.

To achieve operation of the transmission assembly 10 in the highest available speed ranges, the shift lever 94 is moved from the fifth gear position in the conventional shift pattern upwardly and to the right and further upwardly to place it in the position designated 4H. In so doing, the shift rail associated with the highest speed gears, namely, shift rail 42 is repositioned rearwardly in the transmission assembly 10. Since the slot 72 in the shift yoke 62 is relatively deep, lateral motion beyond the first position initially necessary to merely engage the slot 72 to a second position is readily accommodated. Such additional lateral motion results in positioning of the locking and actuating structure 120 and specifically the surface 124 in contact with the rightmost surface 134 on the rightmost tab 132 illustrated in FIG. 3. Such engagement guides the shift lever 94 along the shift pattern line connecting the shift positions 4H and 5H illustrated in FIG. 4 and axially translates the plunger 128 from the first, deactivated position to a second, activated position, thereby commanding the operator 82 to shift the high-low gear box 80 to shift from its low range to its high range position. Clearly, such activity, that is, the shift between fifth gear and the fourth high (4H) gear is accomplished according to a normal sequence of shifting, with the clutch disengaged and as if the transmission included a sixth forward gear. That is, no additional manual steps are required by the operator such that shifting an auxiliary switch mounted on the shift lever or some other location to effect shifting of the transmission assembly 10 into a higher speed gear ratio than that available through the main transmission assembly.

The shift from the fourth high (4H) gear to the fifth high (5H) gear is equally expeditiously accomplished. The shift lever 90 is moved directly downwardly from the fourth high (4H) gear position to the fifth high (5H) gear position. In so doing, the surface 124 is moved from behind the rightmost surface 124 illustrated in FIG. 3 to the leftmost surface 134 illustrated in FIG. 3, maintaining actuation of the plunger 128 of the switch assembly 126 while simultaneously effecting a shift in the main transmission assembly 10 between fourth gear and fifth gear. Since the high-low gear box 80 has been maintained in high range position, what is effectively a seventh forward speed has been achieved. In order to return to any lower gear, the shift lever 94 is simply moved to the appropriate position of the pattern. Any shift out of the rightmost leg of the pattern will, of course, result in release of the plunger 128 to its first, deactivated position and thus a shift by the operator 82 of the high-low gear box 80 to its lower range.

It should thus be apparent that the instant invention permits rapid and simple selection of the higher range of the high-low gear box 80 as desired and through the utilization of an extended, though substantially conventional shift pattern. It should be equally apparent that the instant invention provides such augmented forward gear ratios only in the highest gear positions and conversely prohibits selection of the higher speed gear ratio of the high-low gear box 80 in combination with any of the other gear ratios of the transmission assembly 10 except the two highest. Finally, it should be noted that nothing herein should be construed to limit the application of the instant invention to a transmission having five forward gears. It should be obvious that the extended gear ratio capability and shift pattern provided by the instant invention can be readily adapted to a transmission having, for example, but two shift rails and four gear ratios or a transmission having four or more shift rails and eight or more selectable gear ratios.

The foregoing disclosure is the best mode devised by the inventor for practicing this invention. It is apparent, however, that apparatus incorporating modifications and variations to one skilled in the art of vehicle transmissions. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A gear ratio selection device for use with a transmission assembly comprising, in combination, a main gear box having an input shaft, an output shaft, a plurality of gear sets providing a plurality of independently selectable gear ratios between said input shaft and said output shaft, a pivotally disposed shift lever, at least one shift rail, a shift yoke secured to said shift rail and including a slot for receiving a portion of said shift lever, a pair of aligned, spaced-apart, stationary guide means for limiting movement of said shift lever along a first path and a second path parallel to said first path while said portion of said shift lever is disposed within said slot, auxiliary gear box means in tandem with said main gear box for providing at least two selectable gear ratios, control means activated by said shift control lever for selecting of one of said auxiliary gear box ratios when said shift lever is disposed along said first path and selecting the other of said two gear ratios when said portion of said shift lever is along said path.

2. The gear ratio selection device of claim 1 wherein said main gear box includes a housing and said shift control lever is pivotally secured to said housing.

3. The gear ratio selection device of claim 1 wherein said one shift rail is operably coupled to a dog clutch associated with the one of said gear sets providing the highest speed gear ratio.

4. The gear ratio selection device of claim 1 wherein said shift lever has an axis of pivot normal to said first and second paths.

5. The gear ratio selection device of claim 4 wherein said guide means each include a radiused surface and said center of said radiused surface is said axis of pivot.

6. The gear ratio selection device of claim 1 wherein said control means includes a two position sensor for sensing the position of said shift control lever in one of said first and said second paths and providing a corresponding output indication.

7. The gear ratio selection device of claim 6 wherein said control means further includes a mechanical operator for selecting one of said selectable gear ratios of said auxiliary gear box in response to said output indication.

8. The gear ratio selection device of claim 7 wherein said two position sensor is an electric switch and said mechanical operator is a solenoid.

9. The gear ratio selection device of claim 1 further including means secured to said shift lever for engaging said guide means.

10. A transmission and range box control for use with a main transmission having a plurality of gear sets providing a plurality of independently selectable gear ratios between an input shaft and an output shaft and an auxiliary range box disposed in tandem with said main transmission having two selectable gear ratios comprising, in combination, a pivotally disposed shift lever, at least one shift rail, a shift yoke secured to said shift rail and defining a slot means for receiving a portion of said shift lever, a pair of aligned, spaced-apart, stationary guide means for limiting movement of said shift lever along and a first path and a second path parallel to said first path when said shift lever portion is engaged in said slot, sensor means for sensing the position of said shift control in one of said first and said second paths and providing a corresponding output indication and operator means coupled to said sensor means for selecting one of said two selectable gear ratios of said auxiliary range box.

11. The gear ratio selection device of claim 10 wherein said one shift rail is operably coupled to a dog clutch associated with the one of said gear sets providing the highest speed gear ratio.

12. The gear ratio selection device of claim 10 wherein said shift lever has an axis of pivot normal to said first and second paths.

13. The gear ratio selection device of claim 12 wherein said guide means each include a radiused surface and said center of said radiused surface is said axis of pivot.

14. The transmission and range box control of claim 10 wherein said sensor means is an electric switch and said operator means is a solenoid.

15. The gear ratio selection device of claim 10 further including means secured to said shift level for engaging said guide means.

16. In a transmission assembly having a main gear box having a housing, an input shaft, an output shaft, a plurality of gear sets providing a plurality of independently selectable gear ratios between said input shaft and said output shaft, a shift lever pivotally disposed in said housing, at least one shift rail slidably disposed in said housing, and an auxiliary range box in tandem with said main gear box providing two selectable gear ratios, the improvement comprising, a shift yoke secured to said shift rail and defining a slot for receiving a portion of said shift lever, a pair of aligned, spaced-apart, stationary guide means for confining movement of said movement lever along a pair of parallel shift paths when said shift lever is disposed within said slot, means secured to said shift lever for engaging said guide means, a two position sensor means for sensing the position of said shift control in one of said first and said second paths and providing a corresponding output indication and operator means coupled to said sensor means for selecting one of said two selectable gear ratios of said auxiliary range box.

17. The improvement of claim 16 wherein said one shift rail is operably coupled to a dog clutch associated with the one of said plurality of gear sets providing the highest speed gear ratio.

18. The improvement of claim 16 wherein said shift lever has an axis of pivot normal to said first and second paths.

19. The improvement of claim 18 wherein said guide means each include a radiused surface and said center of said radiused surface is said axis of pivot.

20. The improvement of claim 16 wherein said sensor means is an electric switch and said operator means is a solenoid.

* * * * *